PHONOGRAPH STYLUS AND MOUNTING THEREFOR

Filed July 24, 1959

Inventor
Clarence F. Jensen
By Donald L. Welsh
Attorney 3,002,759

PHONOGRAPH STYLUS AND MOUNTING THEREFOR

Clarence F. Jensen, Lombard, Ill., assignor to Jensen Industries, Inc., Forest Park, Ill., a corporation of Illinois Filed July 24, 1959, Ser. No. 829,407
4 Claims. (Cl. 274—37)

This invention relates generally to phonograph pickups and more particularly, to a pickup having a record-engaging stylus which is subject to wear and is intended to be removed and replaced when it becomes worn.

The primary object of the invention is to provide a novel stylus construction and mounting which are simple and inexpensive to manufacture, which facilitates the removal and replacement of worn styli, and which are easily adaptable to the use of the styli of different sizes in the same pickup.

Another object is to facilitate the replacement of styli by constructing each stylus and its mounting member in a novel manner enabling the stylus to be retained in its operating position without adhesive or other securing means likely to interfere with its removal.

A further object is to provide a novel stylus mounting enabling the stylus to be formed inexpensively of a single piece of wire.

Other objects and advantages of the invention will become apparent from the following description taken in connection with the accompanying drawings in which.

Figure 1:
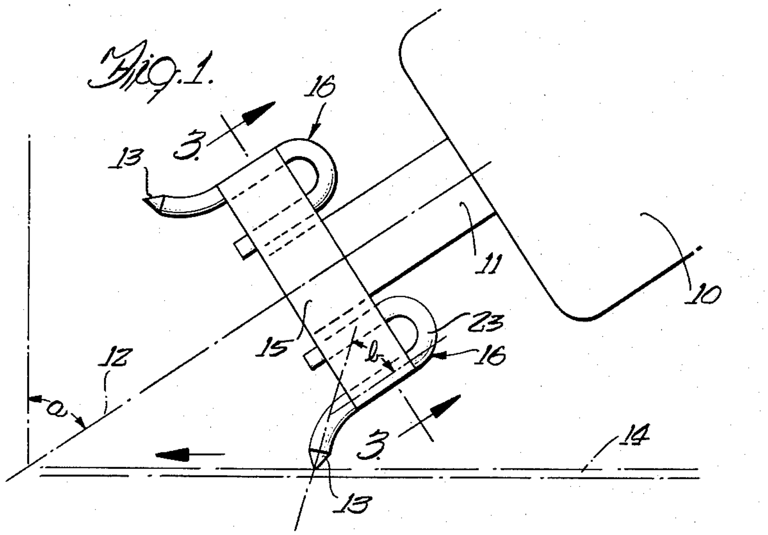
FIGURE 1 is a fragmentary side elevational view of a phonograph pickup embodying the novel features of the present invention.

The pickup shown in the drawings to illustrate the present invention comprises generally a body 10 adapted to be mounted on the tone arm (not shown) of a record player and carrying a transducer element 11. In this instance, the element is an elongated piezoelectric crystal or of a suitable ceramic material of rectangular cross section with its axis inclined downwardly as indicated at 12. Connected to the element is one or more styli 13 which project downwardly from the pickup for engagement with a record 14 rotating in a horizontal plane beneath the pickup. There are two styli in the present instance and they are disposed on diametrically opposite sides of the transducer element, the styli being of different sizes to accommodate different sizes of record grooves. To enable one stylus or the other to be brought into operative position for engagement with the record, the body is mounted on the tone arm in a suitable manner well known in the art for rotation about the axis of the transducer element. Either stylus then may be shifted into the lower operative position simply by turning the holder.

In accordance with the present invention, each stylus 13 and the mounting therefor are constructed in a novel manner reducing the cost of their manufacture and facilitating replacement of the styli individually. To these ends, the styli are connected to the transducer element 11 through the medium of a yoke block 15 and are retained in an operative position thereon without adhesive or other securing means liable to impede the removal of each stylus. Such retention of each stylus is effected by securing it to a U-shaped member 16 with laterally spaced legs 17 and 18 and by forming in the yoke block 15 apertures or recesses 19 and 20 which receive the legs with the recess walls frictionally engaging the legs. The spacing of adjacent walls of the recesses which are engaged by the legs of each stylus member is equal approximately to the spacing of the legs so that the legs may be slid lengthwise into and out of the recesses without being stressed toward or away from each other. The stylus is carried on the outer end of one leg 17 of each U-shaped member projecting downwardly beyond the other leg 18.

The yoke block 15 in the present instance is of generally rectangular shape and extends perpendicular to the longitudinal axis 12 of the transducer element 11. Intermediate its ends, the block is formed with a hole 21 which receives the lower end portion of the transducer element. While the element may be of circular cross section with a similarly shaped hole, the hole is rectangular in this instance because the element is of rectangular cross section. A suitable adhesive secures the element to the block. To achieve the desired compliance, that is, relative movement between the pickup body 10 and each stylus 13 and still enable the stylus member 16 to be relatively stiff, the yoke block preferably is formed of a resilient material such as butyl rubber or cellulose nitrate. In case the block is formed of a relatively hard material, other provisions may be made to provide the desired compliance.

Figure 2:
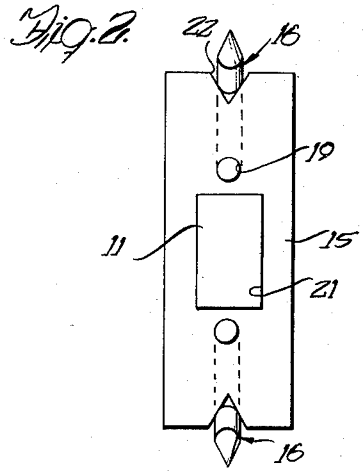
FIG. 2 is a bottom plan view of the stylus mounting member supporting two styli.
Figure 3:
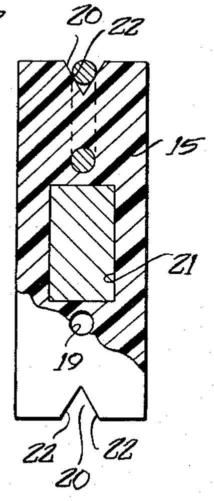
FIG. 3 is a sectional view taken along line 3—3 of FIG. 1.
Figure 4:
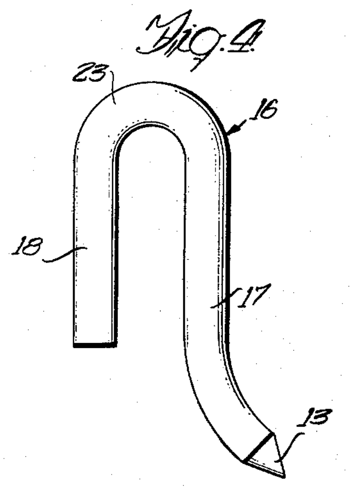
FIG. 4 is a side elevational view of one stylus.

At each end portion of the yoke block 15, the recesses 19 and 20 for one stylus are spaced apart longitudinally of the yoke block. The inner recess 19 is cylindrical and its axis parallels the axis 12 of the transducer element. To simplify the construction, the outer recess 20 extends along and opens outwardly from the extreme end of the yoke block. In this instance, this recess is defined by two walls 22 which intersect to form a V. The spacing of these walls from the cylindrical recess is such that, with the longer leg 17 of a stylus member 16 engaging both walls as shown in FIGS. 2 and 3, the other leg 18 fits and slides easily into the cylindrical recess without being stressed toward or away from the longer leg.

A further simplification and reduction in construction costs is obtained by forming each stylus member 16 as a single piece of wire with one end terminating in the stylus 13. While separate pieces of stylus material such as sapphire, osmium, or diamond may be secured to one end of the wire, the construction shown in the drawings is achieved by pointing or sharpening the extreme end of the longer leg 17 to form the stylus 13. In this instance, the wire is composed of an alloy of nickel, copper, iron, manganese and other metals and sold under the tradename of Monel metal, the diameter of the wire being on the order of .027 of an inch. Preferably, the stylus is inclined from a perpendicular with respect to the record at the point of engagement with the record and in a direction opposite to the direction of travel of the record past the stylus, such direction of travel being indicated by the arrow in FIG. 1. To obtain such inclination where, as in this instance, the axis 12 of rotation of the yoke block 15 is similarly inclined, the desired inclination of the stylus is achieved by extending the stylus at an acute angle with respect to the longer leg 17 of the stylus member. Such angle indicated at *b* in FIG. 1 is smaller than the angle of inclination of the axis of rotation with respect to the vertical as indicated at *a*. Herein, the angle *b* is equal to approximately 15 degrees.

With the legs 17 and 18 of each stylus member 16 supported at an inclination with respect to a perpendicular to the record 14 and with the stylus 13 inclined relative to such leg portions, the frictional force of engagement of the stylus with the record tends to pull the stylus along with the record and thereby urge the stylus member into the mounting block 15. The direction of the force on the stylus is the same as the direction of movement of the record as indicated by the arrow in FIG. 1. The recesses 19 and 20 extend in this same general direction and the stylus thus is retained in the block even though there is no adhesive or spring force securing it to the block.

To remove and replace a stylus 13 after it becomes worn, the closed end or lateral connecting portion 23 of the stylus supporting member 16 is simply pulled away from the mounting block 15 in a direction paralleling the recesses 19 and 20 in the block and the leg portions 17 and 18 thus are withdrawn from the recesses. Due to the equal spacing of the leg portions and the parts of the mounting block engaged thereby, and the consequent lack of stressing of the stylus member, there is little or no frictional resistance between the member and the block to impede withdrawal of the member. Similarly, it is easy to insert the legs of a new stylus member into the recesses simply by locating the legs in registry with the recesses and applying on the closed end portion of the member a force exerted toward the mounting block. Once the member is in the block and while it engages a record 14, the frictional force between the stylus and the record tends to pull the member along with the record and thereby retain the member in the block, this action taking place because of the extension of the end portion of the longer leg laterally away from the portion of that leg which parallels the shorter leg. Being parts of a single piece of wire, each stylus and its supporting member may be formed easily and at a low cost.

I claim as my invention:

1. In a phonograph pickup, the combination of an elongated transducer element supported in a position of downward inclination of its longitudinal axis and adapted to be rotated about such axis, a generally rectangular mounting block secured to the lower end portion of said element and extending generally perpendicular to said axis thereof, means on said block on opposite sides of said end portion of said element defining apertures extending through the block and paralleling said axis, the ends of said block having V-shaped recesses opening outwardly away from said axis and defined by walls spaced substantially equal distances from said apertures, and a pair of U-shaped stylus members carried by said block and each formed of a single integral piece of wire and having a first straight leg and another leg terminating in a sharpened point to fit into a record groove and extending from the bottom of the U first parallel to the first leg throughout the length of the first leg and then laterally away from the first leg at an angle less than the angle between said axis and the vertical whereby, when said block is turned into a vertical plane and the stylus member is mounted on the lower end of the block with the first leg inserted into the lower aperture and the parallel portion of said other leg lying against said walls of the lower one of said V-shaped recesses, said laterally bent portion of the member projects downwardly from the block at an inclination of the same direction as the inclination of said axis but at a smaller angle with respect to the vertical, said block being formed of a resilient material and the spacing between said parallel leg portions of each stylus member being equal approximately to the spacing between said walls of each of said recesses and the adjacent one of said apertures to facilitate insertion and removal of the stylus member.

2. In a phonograph pick-up, the combination of an elongated transducer element supported in a position of downward inclination of its longitudinal axis and adapted to be rotated about such axis, a generally rectangular mountaing block secured to the lower end portion of said element and extending generally perpendicular to said axis thereof, means on said block on opposite sides of said end portion of said element defining apertures extending through the block and paralleling said axis, the ends of said block having V-shaped recesses opening outwardly away from said axis and defined by walls spaced substantially equal distances from said apertures, and a pair of U-shaped stylus members mounted on said block and each having a first straight leg and another leg supporting a stylus at its projecting end and extending from the bottom of the U first parallel to the first leg throughout the length of the first leg and then laterally away from the first leg at an angle less than the angle between said axis and the vertical whereby, when said block is turned into a vertical plane and the stylus member is mounted on the lower end of the block with the first leg inserted into the lower aperture and the parallel portion of said other leg lying against said walls of the lower one of said V-shaped recesses, said laterally bent portion of the member projects downwardly from the block at an inclination of the same direction as the inclination of said axis but at a smaller angle with respect to the vertical, the spacing between said parallel leg portions of each stylus member being equal approximately to the spacing between said walls of each of said recesses and the adjacent one of said apertures to facilitate insertion and removal of the stylus member.

3. In a phonograph pickup, the combination of a mounting block adapted to be connected to a transducer element, generally parallel surfaces on said block facing in opposite directions away from each other and defining elongated laterally spaced recesses having parallel longitudinal axes, a stylus member of U-shape having parallel legs fitting in said recess portions and normally spaced apart a distance equal to the spacing of said surfaces so that the legs may be moved easily into and out of the recess portions without stressing, the free end portion of one of said legs projecting beyond said block and away from the remainder of the leg at an angle with respect to said parallel surfaces, and a stylus on the end of said projecting end portion of said leg, said block being mounted so that the angle of said free end position of said one leg is inclined relative to the vertical at an angle smaller than the angle of inclination of said axes whereby the friction between said stylus and a record tends to pull said stylus member into said block due to the angular relation between said projecting end portion and said remainder of said one leg.

4. In a phonograph pickup, the combination of a mounting block adapted to be connected to a transducer element, generally parallel surfaces on said block facing in opposite directions away from each other and defining laterally spaced elongated recesses having parallel longitudinal axes, a stylus member of U-shape having parallel legs fitting in said recess portions and normally spaced apart a distance equal to the spacing of said surfaces so that the legs may be moved easily into and out of the recess portions without stressing, the free end portion of one of said legs projecting beyond said block, and a stylus on the end of said projecting end portion said block being mounted with said recess axes inclined with respect to the vertical and in a direction opposite to the movement of a record past the block whereby the friction between said stylus and the record tend to pull said stylus member into said recesses and maintain the stylus member and the block in assembled relation.

References Cited in the file of this patent

UNITED STATES PATENTS

| | | |
|---|---|---|
| 1,508,163 | Clifton | Sept. 9, 1924 |
| 2,563,196 | Spry | Aug. 7, 1951 |
| 2,768,845 | Palo | Oct. 23, 1956 |